US010532707B2

(12) United States Patent
Troffer et al.

(10) Patent No.: US 10,532,707 B2
(45) Date of Patent: Jan. 14, 2020

(54) MOTOR VEHICLE AND METHOD FOR PRODUCING A MOTOR VEHICLE

(71) Applicant: Bayerische Motoren Werke Aktiengesellschaft, Munich (DE)

(72) Inventors: Franz Troffer, Grosskoellnbach (DE); Anton Niedermeier, Vilsbiburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 318 days.

(21) Appl. No.: 15/584,602

(22) Filed: May 2, 2017

(65) Prior Publication Data

US 2017/0232912 A1    Aug. 17, 2017

Related U.S. Application Data

(63) Continuation of application No. PCT/EP2015/074360, filed on Oct. 21, 2015.

(30) Foreign Application Priority Data

Nov. 4, 2014 (DE) .................... 10 2014 222 441

(51) Int. Cl.
*H01R 33/00* (2006.01)
*B60R 16/02* (2006.01)
*B60K 37/04* (2006.01)

(52) U.S. Cl.
CPC .......... *B60R 16/0215* (2013.01); *B60K 37/04* (2013.01); *B60R 16/02* (2013.01); *B60R 16/0207* (2013.01)

(58) Field of Classification Search
CPC . B60R 16/0215; B60R 16/02; B60R 16/0207; B60K 37/00; B60K 37/04;
(Continued)

(56) References Cited

U.S. PATENT DOCUMENTS

2002/0017798 A1    2/2002    Shikata et al.
2003/0094831 A1    5/2003    Kondo et al.
2012/0079694 A1    4/2012    Anders

FOREIGN PATENT DOCUMENTS

DE    199 39 433 A1    2/2001
DE    101 24 995 A1    11/2001
(Continued)

OTHER PUBLICATIONS

German Search Report issued in counterpart German Application DE 10 2014 222 441.1 dated Oct. 12, 2015 with partial English translation (thirteen (13) pages).
(Continued)

*Primary Examiner* — Khiem M Nguyen
(74) *Attorney, Agent, or Firm* — Crowell & Moring LLP

(57) ABSTRACT

A motor vehicle has a control device which is arranged in a cockpit module and has a cable harness, which includes at least one data and/or power cable, for connecting the control device to an on-board electrical system of the motor vehicle. The control device has at least one connection for making electrical contact with the cable harness. An improved utilization of the available installation space in the cockpit region and a shortening of the requisite length of the cable harness is obtained by the connection of the control device being arranged on a side of the control device which faces an interior of the motor vehicle.

13 Claims, 5 Drawing Sheets

(58) Field of Classification Search
CPC ............ B60K 2370/44; B60K 2370/81; B60K 2370/834; B60K 2370/46; H01R 33/00
USPC .................................. 439/34, 502; 174/72 A
See application file for complete search history.

(56) References Cited

FOREIGN PATENT DOCUMENTS

| | | |
|---|---|---|
| DE | 100 63 190 A1 | 6/2002 |
| DE | 102 51 746 A1 | 6/2003 |
| DE | 10 2008 014 142 A1 | 9/2009 |
| DE | 10 2009 001 457 A1 | 9/2010 |
| EP | 1 844 987 A1 | 10/2007 |
| FR | 2 891 513 A1 | 4/2007 |
| JP | 2004-203305 A | 7/2004 |
| WO | WO 2011/100891 A1 | 8/2011 |

OTHER PUBLICATIONS

International Search Report (PCT/ISA/210) issued in PCT Application No. PCT/EP2015/074360 dated Jan. 19, 2016 with English translation (seven (7) pages).
German-language Written Opinion (PCT/ISA/237) issued in PCT Application No. PCT/EP2015/074360 dated Jan. 19, 2016 (five (5) pages).

MOTOR VEHICLE AND METHOD FOR PRODUCING A MOTOR VEHICLE

CROSS REFERENCE TO RELATED APPLICATIONS

This application is a continuation of PCT International Application No. PCT/EP2015/074360, filed Oct. 21, 2015, which claims priority under 35 U.S.C. § 119 from German Patent Application No. 10 2014 222 441.1, filed Nov. 4, 2014, the entire disclosures of which are herein expressly incorporated by reference.

BACKGROUND AND SUMMARY OF THE INVENTION

The present invention relates to a motor vehicle, especially a passenger car, having a control device which is arranged in a cockpit module and having a cable harness which comprises at least one data and/or power cable for connecting the control device to an on-board electrical system of the motor vehicle, as well as a method for producing the motor vehicle.

The elements arranged in an interior front region of motor vehicles such as cars and trucks are often called collectively the cockpit. A cockpit can contain operating and display elements (such as the display instruments of the dashboard), decorative elements (such as trims), storage elements (such as a glove compartment or an ash tray), and other elements. Many elements arranged in the region of the cockpit are at first assembled into a so-called cockpit module at a separate preassembly station during the production of a motor vehicle.

It is also known how to arrange electronic control devices of the motor vehicle in the cockpit region. This is especially customary for those control devices whose operating and display elements should be easily accessible to a driver or passenger of the motor vehicle during driving. For example, it has long been customary to provide a so-called DIN shaft in the cockpit to receive a radio set of standard size. Typically, such a radio set has operating and display elements on its front side, as well as openings to receive audio media (such as music cassettes or compact discs) and electrical ports on its rear side for loudspeaker and antenna cables. The radio set is connected to the cables and shoved into the shaft so that the front side of the radio set is flush with the surfaces of the cockpit surrounding the DIN shaft.

In modern motor vehicles, multimedia control devices are generally used, whose range of functions far surpasses that of traditional radio sets. For example, such multimedia control devices may include telephone and navigation functions. Also, the operating and display elements associated with the multimedia control device are often no longer arranged directly on a front side of the multimedia control device, but rather instead at other places in the cockpit. Even so, multimedia control devices are today still substantially installed in the motor vehicle as was described above for traditional radio sets. Thus, first of all the connection cables are connected to the ports located on a back side of the multimedia control device. Besides audio and antenna cables, data cables are also often hooked up, connecting the multimedia control device to the separate operating and display elements, for example. Next, the multimedia control device is shoved into a shaft provided for this purpose in the cockpit, so that the front side is substantially flush with the surface of the cockpit surrounding the shaft, generally leaving enough room for an element covering the front side of the multimedia control device, such as a decorative trim. The prior art installation occurs, for example, in the series 3 vehicle model offered by the Applicant, which will be described at length below in regard to the enclosed figures.

The described arrangement of the multimedia control device in the motor vehicle and the described installation method of the prior art have several drawbacks. The first drawback is that the cable harness comprising the cables needed for the connection of the multimedia control device needs to be at least long enough so that it can be led out from the installation shaft during the mounting of the multimedia control device. After the cable harness has been connected to the multimedia control device and the latter has been pushed into the installation shaft, the cable harness is thus longer than needed. Therefore, an otherwise unusable volume must be kept clear for the excess length of the cable harness behind the control device, which constitutes a further drawback. Not least of all, the drawback of the prior art is that the multimedia control device cannot be installed in the cockpit module already during preassembly, since it has to be connected first of all to the cable harness (generally already installed in the body of the motor vehicle) on its rear side.

Therefore, the problem which the invention proposes to solve is to provide a motor vehicle which enables a better utilization of the available design space in the cockpit region as well as a shortening of the required length of the cable harness. Furthermore, there is needed an improved method for producing a motor vehicle.

The problem is solved by a motor vehicle, especially a passenger car, having a control device which is arranged in a cockpit module and a cable harness which comprises at least one data and/or power cable for connecting the control device to an on-board electrical system of the motor vehicle. The control device has at least one port for making electrical contact with the cable harness. According to the invention, this port is arranged on a side of the control device which faces an interior of the motor vehicle. In other words, the cable harness is no longer hooked up at the rear side (facing the front of the vehicle), but instead at the front side of the control device (facing the interior of the vehicle). The invention thus rotates the installation position of the control device by 180 degrees about its vertical axis. The control device itself does not necessarily have to be modified in order to implement the invention.

The inventors have discovered that the prerequisites, which have led to the installation position of control devices in the cockpit region that are familiar in the prior art, have disappeared with technical progress. On the one hand, as described above, operating and display elements of control devices arranged in the cockpit region are generally no longer an integral part of these control devices, but instead arranged separately and joined by way of data lines to the control device. A further reason for the arrangement of a control device in the cockpit region so that the front side of the control device is substantially flush with the surface of the cockpit surrounding the installation shaft is so that the control device can be set up to receive audio and data media, especially CDs and DVDs. Due to the diminishing importance of such audio and data media, however, this prerequisite has also disappeared in many cases.

Since the control device has the port on the side facing the interior of the motor vehicle (i.e., the front side of the control device), the space required in the prior art for the excess cable length of the cable harness can be eliminated or used for other purposes. Furthermore, the cable harness no longer needs to be pulled out from the installation shaft when hooking up the control device. Thus, it is no longer necessary to make the cable harness longer for purposes of installation than is necessary in the installed state of the control device. Instead, the length of the cable harness can be what is required for the final installation position. The invention thus makes it possible to economize on the weight caused by the excess length of the cable harness and on the associated costs.

The invention furthermore makes it possible to arrange control devices in the cockpit region in a more flexible way. For example, control devices can be moved further backward (i.e., toward the vehicle front). This enables greater design freedom in the development of the cockpit region. In particular, the formerly existing constraints in the design of the visible cockpit region are eliminated.

Advantageously, the control device is a multimedia control device. The multimedia control device of modern motor vehicles, as already described above, can have a multitude of functions. These functions include the reception of radio and television signals, as well as the playing and possibly the recording of audio and data media, the outputting of audio signals, the control of operating and display elements, telephone functions, and navigation functions. Often, the multimedia control device also constitutes the central control device for the so-called rear seat entertainment, i.e., for the electronic entertainment elements provided for the passengers on the rear seats. The multimedia control device, on account of the described range of functions, represents one of the biggest control devices installed in the cockpit region in modern motor vehicles. Therefore, the invention can be used with special advantage for the multimedia control device. Namely, the invention makes it possible to choose the installation location of the multimedia control device in the cockpit region in a more flexible manner than before. The multimedia control device can be installed in this location and then the cable harness can be connected to it according to the invention. The design space required to contain the excess length of the cable harness without the invention can be eliminated, so that on the whole less space needs to be provided for the installation of the multimedia control device.

In a further advantageous embodiment of the invention, the control device is arranged in a central region of the cockpit module. Typically, operating and display elements which should be within sight or reach of the driver and passenger are arranged in the central region of the cockpit. This includes, for example, the operating and display elements of the radio set and air conditioning system. Therefore, the control devices traditionally having these operating and display elements, especially radio sets, were also therefore arranged in the central region, as described above. But the available space in the central region is becoming scarce with the increasing number of elements to be accommodated in the cockpit region and with the increasing size of the control devices. Therefore, control devices mounted in a traditional manner have a constraining effect on the design freedom of the cockpit region. Since the invention applies to control devices in the central region, especially the multimedia control device, the central region can have a more flexible design. For example, storage compartments can be provided for the driver, for which no room was available heretofore.

Preferably, the control device is connected by way of an installation frame to a load-bearing structure of the cockpit module. The cockpit module, which as described above is mounted at a separate preassembly station, includes a load-bearing structure. This, in turn, can have on the one hand a cross beam, which is secured to the vehicle body and connects the cockpit module to the body. The cross beam can consist of metal. Furthermore, the load-bearing structure can have an element sometimes called a function carrier, on which the other elements of the cockpit module can be secured. The function carrier can consist of plastic. This load-bearing structure of the cockpit module may differ greatly in its specific configuration between different vehicle models. But an installation frame is still advantageous to installing a particular control device model as flexibly as possible in different vehicle models. The elements of the installation frame can have different configurations depending on vehicle model for the fastening to the load-bearing structure of the cockpit module, while the elements of the installation frame can have the same configuration for the fastening of the control device. Furthermore, the use of an installation frame facilitates a later removal of the control device, for example, in the event of a replacement.

In an alternative embodiment, the control device is directly connected to the load-bearing structure of the cockpit module. In this case, no installation frame will be used. This embodiment is recommended when the above-described benefits of the installation frame are of lesser importance, while the primary attention is paid to economizing on material and weight.

In one especially advantageous modification of the invention, the control device is connected to the load-bearing structure of the cockpit module so as to swivel about a pivot axis running in the transverse direction of the vehicle. The connection—as described above—can be made either directly or indirectly by means of an installation frame. Since the control device can swivel, the final installation position may differ from the installation position during the assembly, especially in the step of connecting the cable harness to the control device. In other words, the control device during the assembly may find itself in a substantially horizontal installation position, for example. Once the cables are hooked up, the control device can be swiveled, so that it takes up a substantially tilted position, for example. In this way, it is possible to make even more flexible use of the available room in the cockpit module yet still ensure an optimal mounting position for the control device.

In another preferred embodiment, the cockpit module has a dashboard on its side facing the interior of the motor vehicle, wherein the dashboard comprises a structural part, especially a panel. The structural part has at least one opened and one closed state, wherein the structural part in the opened state frees up an opening of the dashboard and the structural part in the closed state covers the opening of the dashboard. In the opened state, the at least one port of the control device for making electrical contact with the cable harness is accessible from the interior of the motor vehicle. In other words, the port of the control device for the cable harness should be accessible through the opening of the dashboard. This is advantageous both for assembly purposes and for later diagnostic and repair purposes. The structural part can include, for example, operating and/or display elements such as switches, buttons or monitor lights. In order to open and close the opening in an easy manner, however, it is advantageous to use a panel as the structural part, especially a decorative trim. The significant benefit of the invention in this embodiment is that this panel no longer needs to have at least the outside dimensions of the control device. Instead, it is sufficient for the panel to be big enough to enable access to the port of the control device for the cable harness. Namely, thanks to the present invention, it is no longer necessary to first connect the cockpit module (including its dashboard) to the vehicle body and only then connect the control device to the cable harness and shove it through the opening in the dashboard into the cockpit module. Instead, the control device can be installed in the cockpit module already before installing the dashboard. Once the cockpit module has been installed in the vehicle body, it is then only necessary to connect the cable harness to the control device. Then, the structural part is changed to the closed state. For example, the panel is thus fastened on the opening. In the case of repair, such as a suspected faulty electrical connection of the cable harness to the control device, only the panel need be opened to gain access to the port.

A method of this kind for producing a motor vehicle, especially a passenger car, has the following steps:

preassembly of a cockpit module, assembly of a body of the motor vehicle with an on-board electrical system and a cable harness which comprises at least one data and/or power cable for connecting a control device to the on-board electrical system, insertion of the cockpit module into the body of the motor vehicle and connecting of the cockpit module to the body.

Of course, the first two steps do not need to occur in the indicated sequence, but instead can be performed independently of each other, i.e., for example also in parallel or in the reverse order.

The entire on-board electrical system of a modern motor vehicle consists of cables with an overall length of several thousand meters. These cables are therefore generally laid in a very early stage during the vehicle assembly and then gradually hooked up to the different structural parts of the motor vehicle connected to the on-board electrical system.

For reasons of efficiency, the larger modules of a motor vehicle, i.e., the cockpit module for example, are mounted to the greatest possible degree at separate preassembly stations and delivered as a whole to the actual assembly line. For the reasons already described, the control device is not installed already in the cockpit module during the cockpit preassembly, but rather this is done on the main assembly line, after the cable harness has been connected to the control device.

According to the invention, the method has the following additional steps:

placement of a control device in the cockpit module, especially in a central region of the cockpit module, so that a side of the control device having one port of the control device for making electrical contact with the cable harness is facing an interior of the motor vehicle, and connecting the cable harness to the port of the control device.

Of course, these two characteristic steps of the method will be performed in the mentioned sequence. Namely, the essence of the invention in its method form consists precisely in this sequence. Thus, whereas in the prior art the control device is at first hooked up and then placed in the cockpit module, according to the invention the control device can at first be mounted and then hooked up to the cable harness. Therefore, there is no need for an excess length (in the final installed state) of the cable harness. A further benefit is that the worker performing the assembly does not have to hold the control device by one hand while hooking up the cable harness. Instead, according to the method of the invention, the control device is in a fixed position in the cockpit module, so that the worker finds it much easier to hook up the cable harness.

In another especially advantageous modification of the method, the step of preassembly of the cockpit module comprises the step of placing the control device in the cockpit module, especially in the central region of the cockpit module. In other words, the control device is placed in the cockpit module already at the preassembly station. The dashboard is generally put in place at the preassembly station, wherein the opening enabling access to the port of the control device for the cable harness remains free. It is then only necessary on the assembly line to hook up the cable harness to the control device and close the opening with the structural part, such as the panel.

Other objects, advantages and novel features of the present invention will become apparent from the following detailed description of one or more preferred embodiments when considered in conjunction with the accompanying drawings.

The same reference numbers in the figures denote the same features in the represented embodiments of the invention. It is pointed out that the represented figures and the corresponding description only involve sample embodiments of the invention. In particular, representations of feature combinations in the figures and/or the figure description should not be interpreted to mean that the invention absolutely requires the realization of all mentioned features. Other embodiments of the invention may contain fewer, more and/or other features.

DETAILED DESCRIPTION OF THE DRAWINGS

Figure 1:
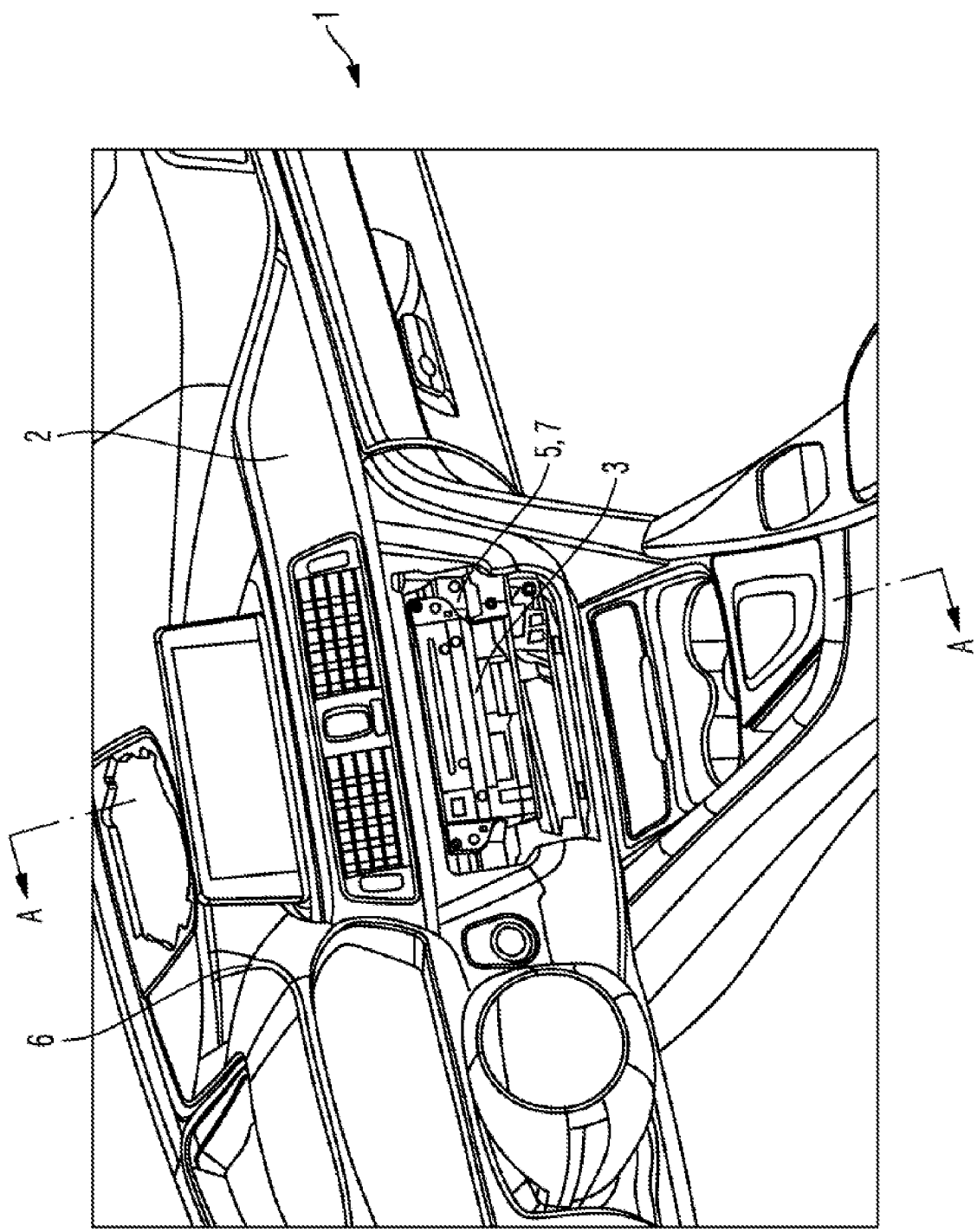
FIG. 1 is a perspective representation of a cockpit region according to the prior art.
Figure 2:
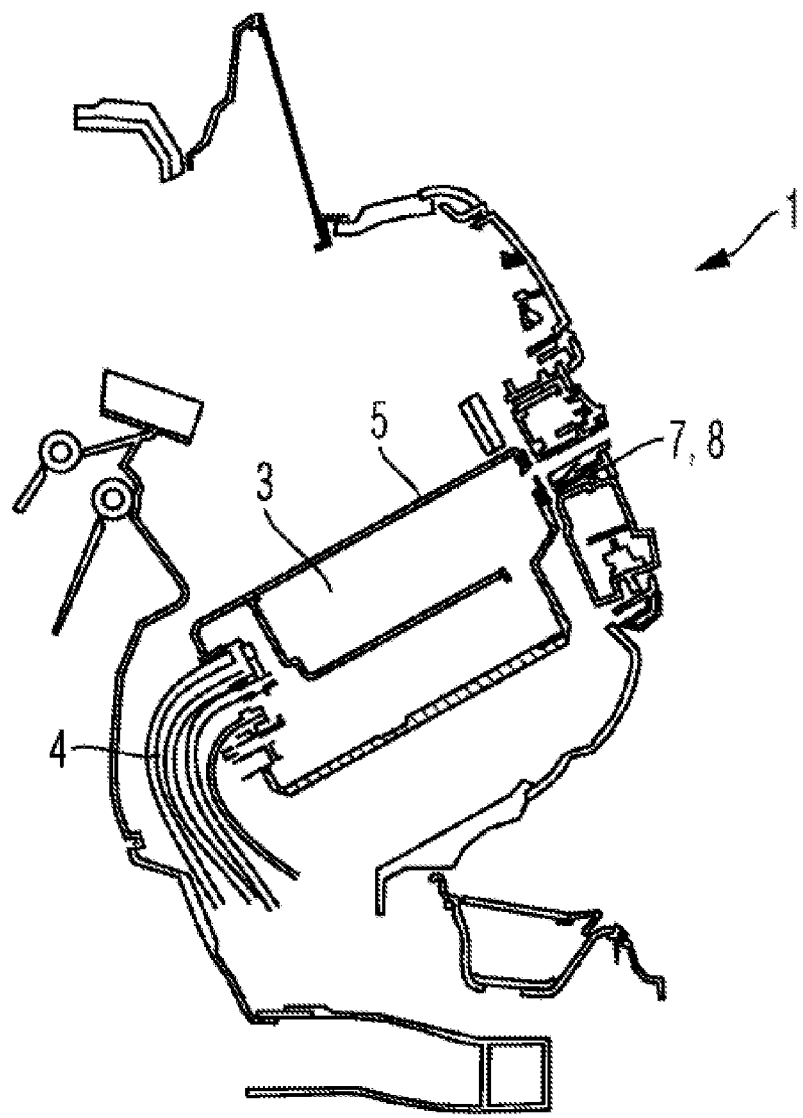
FIG. 2 is a sectional representation of a central region of a cockpit module according to the prior art.

FIG. 1 shows a perspective representation of a cockpit region 1 according to the prior art, which in the present case is a representation of the series 3 model vehicles, offered by the Applicant. FIG. 2 shows a sectional representation of the cockpit region 1 along the sectioning line A-A shown in FIG. 1, wherein FIG. 2 further shows a panel 8 which was omitted from FIG. 1 in order to afford a view of the multimedia control device 3 through the opening 7.

The cockpit region 1 includes a cockpit module 2, which is produced at a separate preassembly station and then connected to the vehicle body. FIGS. 1 and 2 also show a lower central region of the cockpit region 1, in which an ash tray, beverage holder, and armrest surfaces are located. Also situated in this region are gearshift levers and parking brake levers, although they are not shown in FIGS. 1 and 2. The described lower central region is part of the cockpit region 1 and may be part of the cockpit module 2, but this is not absolutely necessary. In other words, the lower central part is not necessarily mounted as part of the cockpit module 2 at the cockpit preassembly station, but instead it can be mounted on the actual vehicle assembly line.

An opening 7 in the dashboard 6 of the cockpit module 2 in FIG. 1 opens up a view of the multimedia control device 3 mounted in an installation frame 5. In FIG. 2, a panel 8 closes the opening 7. In this example shown, panel 8 is not a decorative trim, but rather a structural part 8 which includes operating elements.

In the upper region of the dashboard 6 a display surface (unmarked) is located. Thus, it is evident that the multimedia control device 3 itself has no display surface. However, in FIG. 1 it is evident that the multimedia control device 3 has in its upper portion an oblong opening to receive an audio or data medium in the form of a CD or DVD. The panel 8 covering the opening 7 which is shown in FIG. 2 (and not shown in FIG. 1) has an opening at the position of the CD-DVD slot, so that the user can insert a CD or DVD. As shown in FIG. 2, on the opposite side of the multimedia control device 3, thus on the back side, there is a port for the data and power cables of the cable harness 4, which connect the multimedia control device 3 to the on-board electrical system of the motor vehicle. The term on-board electrical system should be interpreted broadly and encompasses, in particular, the electrical power supply network of the motor vehicle as well as the data bus systems of the motor vehicle, but also individual electrical lines (thus, not incorporated into bus systems or power supply networks).

The mounting of the depicted cockpit region 1 is done such that, first of all, the cockpit module 2 is connected to the vehicle body. Next, the cable harness 4 already laid in the vehicle body at an earlier time is led through the opening 7 and connected to the multimedia control device 3. This process is generally carried out by a worker who is situated inside the vehicle interior, holding the multimedia control device 3 by one hand close to the opening 7 and with the other hand connecting the cable harness 4 to the port on the back side of the multimedia control device 3. Next, the cable harness 4 and the control device 3 are inserted through the opening 7 into the cockpit module 2. In this final installation position, the cable harness 4 is located in a cavity behind the installation frame 5 of the control device 3. In the last step, the opening 7 is closed with the panel 8.

Figure 3:
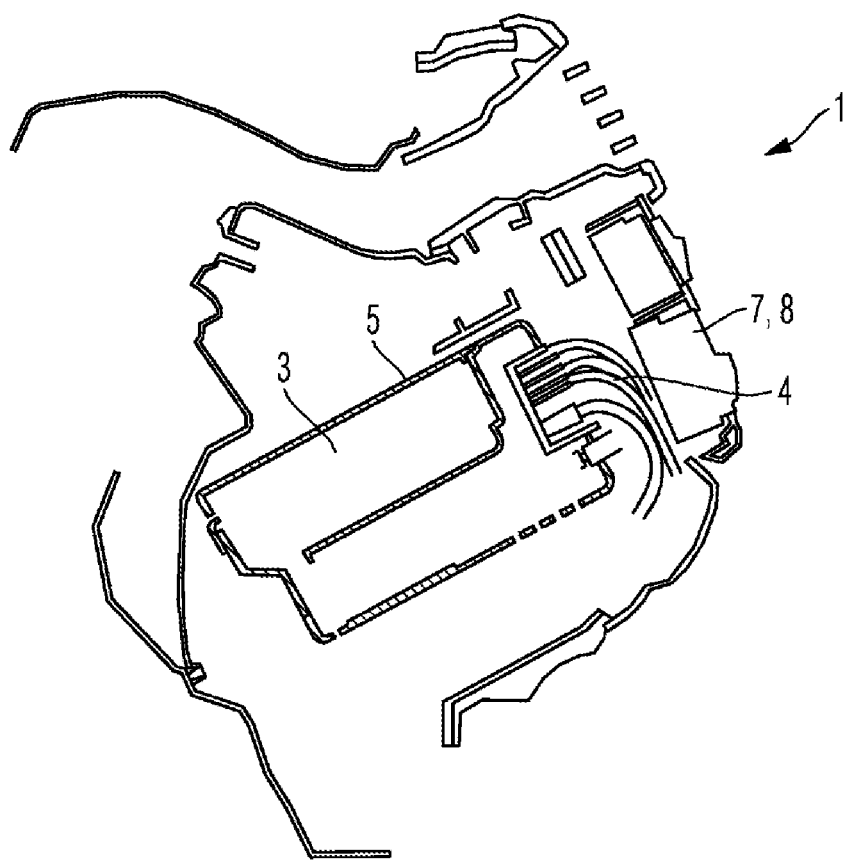
FIG. 3 is a sectional representation of a central region of a cockpit module according to a first embodiment of the invention.

FIG. 3 shows a sectional representation of a central region of a cockpit module according to a first exemplary embodiment of the invention. As compared to the prior art represented in FIG. 2, the multimedia control device 3 has been rotated by 180 degrees about its vertical axis. Thus, the front and rear side of the multimedia control device 3 are switched around. As can be seen, the cable harness 4 is hooked up on the side of the multimedia control device 3 facing the interior of the motor vehicle. Therefore, no longer is a cavity needed to accommodate the cable harness 4 at the rear side of the multimedia control device 3, so that on the whole less room is needed according to the invention.

The invention produces advantages in the assembly of the layout shown in FIG. 2. Namely, the multimedia control device 3 can already be mounted in the installation frame 5 during the separate cockpit preassembly. After the mounting of the cockpit module on the vehicle body, it is only still necessary to hook up the cable harness 4 to the multimedia control device 3. For this, in the present example, the port of the multimedia control device 3 for the cable harness 4 is accessible through the opening 7. The cable harness 4 no longer needs to have any excess length in the later installed position, since it no longer needs to be led from behind (i.e., from the position behind the installation frame) through the opening 7 into the vehicle interior for hook-up. The panel 8 shown in FIG. 3 is mounted after the connection step and closes the opening 7.

Figure 4:
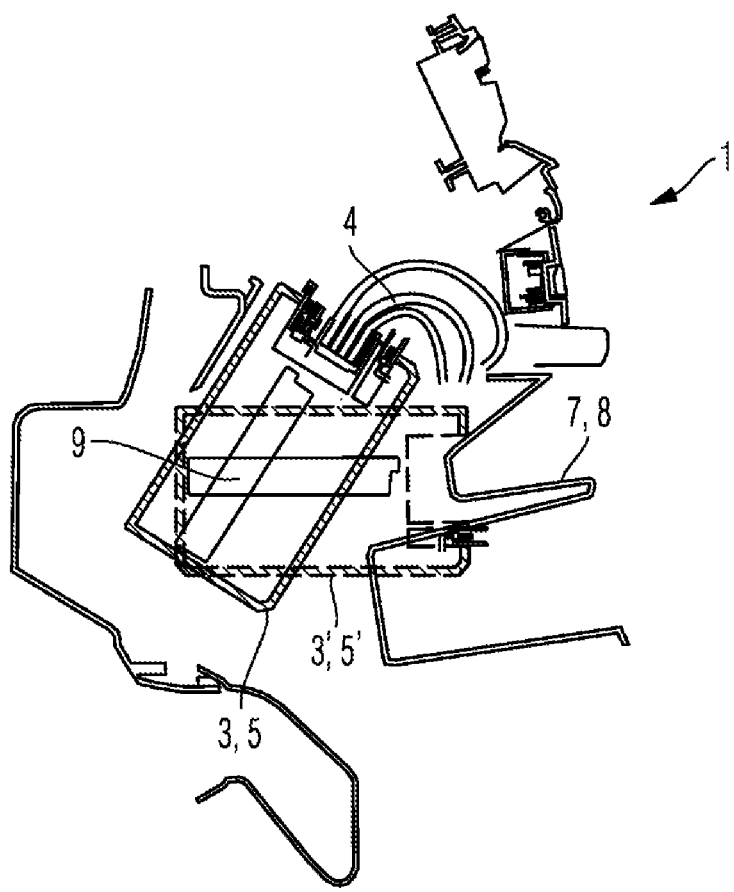
FIG. 4 is a sectional representation of a central region of a cockpit module according to a second embodiment of the invention.

FIG. 4 shows a sectional representation of a central region of a cockpit module according to a second exemplary embodiment of the invention. In this embodiment, the installation frame 5, 5' of the multimedia control device 3, 3' is connected to the load-bearing structure of the cockpit module 2 so as to swivel about a pivot axis 9 running in the transverse direction of the vehicle. It is likewise possible, and included in the invention, for the control device 3, 3' to be arranged swiveling directly on the load-bearing structure, i.e., without an installation frame 5, 5'.

Since the installation frame 5, 5' of the multimedia control device 3, 3' can swivel, the multimedia control device 3, 3' can be placed in various positions. FIG. 4 shows two positions one above the other. The two reference numbers of the installation frame 5, 5' and the multimedia control device 3, 3' shall be used below to designate a first position 3', 5' and a second position 3, 5. In the first position 3', 5' of the multimedia control device 3', the installation frame 5' is shown by a broken line. In this first position 3', 5', the installation frame 5' and the multimedia control device 3' are placed in the cockpit module 2. The cockpit module 2 is then mounted in the vehicle body. FIG. 4 clearly shows that the panel 8 and the multimedia control device 3' overlap in the first position 3', 5'. Thus, the panel 8 cannot be mounted as long as the multimedia control device 3' is in the first position 3', 5'. In the first position 3', 5', the port of the multimedia control device 3' is especially accessible to the cable harness 4. Once the cable harness 4 has been hooked up to the multimedia control device 3', the multimedia control device 3' can be swiveled, so that it changes from its first position 3', 5' to the second position 3, 5. The second position 3, 5 of installation frame 5 and multimedia control device 3 is represented in FIG. 4 by a solid line. When the multimedia control device 3 is in the second position 3, 5, the panel 8 has sufficient space and can be mounted on the opening 7. The benefit of the described embodiment is that the design freedom of the cockpit region and the available space can be increased. Thus, one recognizes in FIG. 4 that the panel forms a storage compartment. The room for this storage compartment is created by the use of the invention in the described embodiment.

Figure 5:
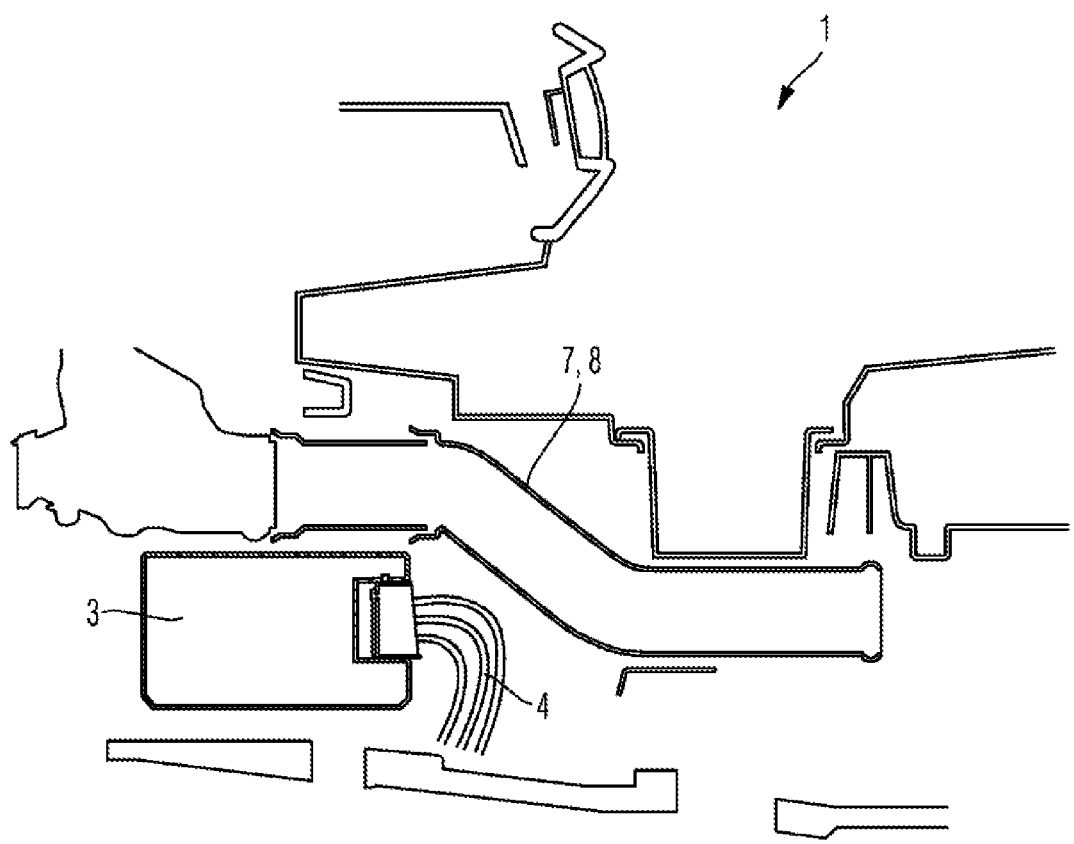
FIG. 5 is a sectional representation of a central region of a cockpit module according to a third embodiment of the invention.

FIG. 5 shows a sectional representation of a central region of a cockpit module 2 according to a third exemplary embodiment of the invention. In this embodiment of the invention, the multimedia control device 3 is arranged in the lower region of the cockpit module 2. Of course, a control device 3 other than a multimedia control device 3 could be involved. Since the control device 3 is no longer arranged in the upper central region of the cockpit module 2—unlike the case in the above described FIGS. 1 to 4—this upper central region can be designed even more flexibly and, for example, it can have an even larger number and size of storage compartments. In the embodiment shown in FIG. 5, the control device 3 is connected directly to the load-bearing structure of the cockpit module 2. Thus, no installation frame is provided. Yet an installation frame could also be provided.

The mounting in this example occurs as already described. Thus, the control device 3 is mounted in the cockpit module 2 during the cockpit preassembly. The cockpit module 2 is then mounted on the vehicle body. One recognizes in FIG. 5 that the opening 7 is an opening 7 in the lower central region of the cockpit region 1. As mentioned above in regard to FIGS. 1 and 2, this lower region is not necessarily part of the cockpit module 2. However, the represented instance where the opening 7 is located in a region of the cockpit region 1 not comprised in the cockpit module 2 should be expressly encompassed by the invention. After the cable harness 4 has been hooked up to the control device 3, the opening 7 is closed with the panel 8. In the embodiment shown, another structural part is mounted via the panel 8, including a beverage holder.

LIST OF REFERENCE NUMBERS

1 cockpit region
2 cockpit module
3, 3' multimedia control device
4 cable harness
5, 5' installation frame
6 dashboard
7 opening
8 panel
9 pivot axis
A-A sectioning line in the central region of the cockpit module The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a cockpit module;
   a control device arranged in the cockpit module;
   a cable harness comprising at least one of a data and power cable that connects the control device to an on-board electrical system of the motor vehicle, wherein
   the control device comprises at least one port for making electrical contact with the cable harness, the at least one port being arranged on a side of the control device facing an interior of the motor vehicle,
   wherein the control device is a multimedia control device.

2. The motor vehicle as claimed in claim 1, wherein the motor vehicle is a passenger automobile.

3. The motor vehicle as claimed in claim 1, wherein the control device is arranged in a central region of the cockpit module.

4. The motor vehicle as claimed in claim 1, wherein the control device is connected via an installation frame to a load-bearing structure of the cockpit module.

5. The motor vehicle as claimed in claim 1, wherein the control device is directly connected to a load-bearing structure of the cockpit module.

6. The motor vehicle as claimed in claim 4, wherein the control device is connected to the load-bearing structure of the cockpit module so as to swivel about a pivot axis running in a transverse direction of the vehicle.

7. The motor vehicle as claimed in claim 5, wherein the control device is connected to the load-bearing structure of the cockpit module so as to swivel about a pivot axis running in a transverse direction of the vehicle.

8. The motor vehicle as claimed in claim 1, wherein
   the cockpit module has a dashboard on a side facing the interior of the motor vehicle,
   the dashboard comprises a structural part,
   the structural part has at least one opened and one closed state,
   the structural part in the opened state frees up an opening of the dashboard and in the closed state covers the opening of the dashboard, and
   in the opened state, the at least one port of the control device for making electrical contact with the cable harness is accessible from the interior of the motor vehicle.

9. A method for producing a motor vehicle, the method comprising the acts of:
   preassembling a cockpit module for the motor vehicle;
   assembling a body of the motor vehicle with an on-board electrical system and a cable harness, the cable harness comprising at least one of a data and power cable for connecting a control device to the on-board electrical system;
   inserting the cockpit module into the body of the motor vehicle and connecting the cockpit module to the body;
   placing a control device in the cockpit module, so that a side of the control device having one port on the control device for making electrical contact with the cable harness is facing an interior of the motor vehicle; and
   connecting the cable harness to the port of the control device,
   wherein the control device is a multimedia control device.

10. The method as claimed in claim 9, wherein the motor vehicle is a passenger automobile.

11. The method as claimed in claim 9, wherein the act of placing the control device in the cockpit module comprises the placing of the control device in a central region of the cockpit module.

12. The method as claimed in claim 9, wherein the act of preassembling the cockpit module comprises the act of placing the control device in the cockpit module.

13. The method as claimed in claim 9, wherein the act of preassembling the cockpit module comprises the act of placing the control device in a central region of the cockpit module.

* * * * *